US012654416B2

(12) United States Patent
Walker et al.

(10) Patent No.: US 12,654,416 B2
(45) Date of Patent: Jun. 16, 2026

(54) COMPOSITE SLEEVE FOR FORMING A CURE IN PLACE PIPE, COMPOSITE PIPES, AND MATERIALS AND METHODS THEREOF

(71) Applicant: ZEPHYROS, INC., Romeo, MI (US)

(72) Inventors: Jason B. Walker, Romeo, MI (US); Kenneth Biscorner, Romeo, MI (US); Brian T. Beckwith, Scottsdale, AZ (US)

(73) Assignee: ZEPHYROS, INC., Romeo, MI (US)

( * ) Notice: Subject to any disclaimer, the term of this patent is extended or adjusted under 35 U.S.C. 154(b) by 455 days.

(21) Appl. No.: 18/015,223

(22) PCT Filed: Jul. 9, 2021

(86) PCT No.: PCT/US2021/041071
§ 371 (c)(1),
(2) Date: Jan. 9, 2023

(87) PCT Pub. No.: WO2022/011250
PCT Pub. Date: Jan. 13, 2022

(65) Prior Publication Data
US 2023/0256703 A1 Aug. 17, 2023

Related U.S. Application Data

(60) Provisional application No. 63/050,377, filed on Jul. 10, 2020.

(51) Int. Cl.
*B32B 1/08* (2006.01)
*B32B 5/02* (2006.01)
(Continued)

(52) U.S. Cl.
CPC ............... *B32B 1/08* (2013.01); *B32B 5/024* (2013.01); *B32B 5/20* (2013.01); *B32B 27/12* (2013.01);
(Continued)

(58) Field of Classification Search
None
See application file for complete search history.

(56) References Cited

U.S. PATENT DOCUMENTS

| | | | |
|---|---|---|---|
| 3,944,631 A | 3/1976 | Yu et al. | |
| 3,984,497 A | 10/1976 | Owens et al. | |

(Continued)

FOREIGN PATENT DOCUMENTS

| | | |
|---|---|---|
| WO | 2005/046973 A1 | 5/2005 |
| WO | 2006/060209 A1 | 6/2006 |
| WO | 2020/033393 A1 | 2/2020 |

OTHER PUBLICATIONS

"What is Cured in Place Pipe" at https://perma-liner.com/what-is-cured-in-place-pipe/ (as accessed on Jan. 9, 2023.).

(Continued)

*Primary Examiner* — Arti Singh-Pandey
(74) *Attorney, Agent, or Firm* — The Dobrusin Law Firm, P.C.

(57) ABSTRACT

The invention relates to composite sleeves for producing a cured in place pipe, to materials and methods for producing the composite sleeve, to methods for repairing a native pipe with the composite sleeve, and to improved cured in place pipes. The composite sleeve has multiple layers including a core layer of a curable one-part resin composition. The curable one-part resin composition is a solid material at 25° C. Preferably the resin composition is pliable at 25° C. so that it can be flexed during manufacturing and/or during installation in a native pipe.

18 Claims, 14 Drawing Sheets

| | |
|---|---|
| 10 | Composite Sleeve |
| 12 | Outer surface of sleeve |
| 14 | Inner surface of sleeve |
| 16 | Opening of sleeve |
| 18 | Multi-layered composite material |

Cross-sectional view of a composite sleeve
| | |
|---|---|
| 20 | Sandwich structure |
| 22 | Core layer |
| 24 | First layer |
| 26 | Second layer |
| 28 | One-part resin composition |
| 30 | Wall thickness of sleeve |
| 32 | Inner diameter of sleeve |
| 34 | Outer diameter of sleeve |

(51) Int. Cl.

| | |
|---|---|
| *B32B 5/20* | (2006.01) |
| *B32B 27/12* | (2006.01) |
| *B32B 27/38* | (2006.01) |
| *B32B 27/40* | (2006.01) |
| *F16L 55/165* | (2006.01) |

(52) U.S. Cl.

CPC .............. *B32B 27/38* (2013.01); *B32B 27/40* (2013.01); *F16L 55/1654* (2013.01); *B32B 2262/101* (2013.01); *B32B 2262/128* (2021.05); *B32B 2363/00* (2013.01); *B32B 2375/00* (2013.01); *B32B 2597/00* (2013.01)

(56) References Cited

U.S. PATENT DOCUMENTS

| | | | |
|---|---|---|---|
| 4,034,013 | A | 7/1977 | Lane |
| 4,096,202 | A | 6/1978 | Farnham et al. |
| 4,304,709 | A | 12/1981 | Salee |
| 4,306,040 | A | 12/1981 | Baer |
| 4,495,324 | A | 1/1985 | Chacko et al. |
| 4,536,436 | A | 8/1985 | Maeoka et al. |
| 5,275,853 | A | 1/1994 | Silvis et al. |
| 5,962,093 | A | 10/1999 | White et al. |
| 2003/0234056 | A1 | 12/2003 | Woolstencroft et al. |
| 2004/0020455 | A1 | 2/2004 | Shafer et al. |

OTHER PUBLICATIONS

International Search Report and Written Opinion, PCT Application No. PCT/US2021/041071 dated Oct. 21, 2021.

| 10 | Composite Sleeve |
| 12 | Outer surface of sleeve |
| 14 | Inner surface of sleeve |
| 16 | Opening of sleeve |
| 18 | Multi-layered composite material |

Cross-sectional view of a composite sleeve

20 Sandwich structure

22 Core layer

24 First layer

26 Second layer

28 One-part resin composition

30 Wall thickness of sleeve

32 Inner diameter of sleeve

34 Outer diameter of sleeve

FIG. 3. Cross-section of composite sleeve having a collapsed configuration.

10' Composite sleeve in a collapsed configuration

FIG. 4. Cross-section of composite sleeve having a collapsed configuration.

10' Composite sleeve in a compressed collapsed, such as a lay flat configuration.

FIG. 5  Cross-sectional view of a pipe formed from a composite sleeve.

50 Composite pipe

52 Sandwich structure

54 Cured core layer

56 First layer impregnated with cured resin composition

58 Second layer impregnated with cured resin composition

FIG. 6 Composite sleeve with protective film and/or adhesive film

36 Inner film layer

38 Outer film layer 10, 10'

70

FIG. 7. Native pipe with a composite sleeve inserted for repair

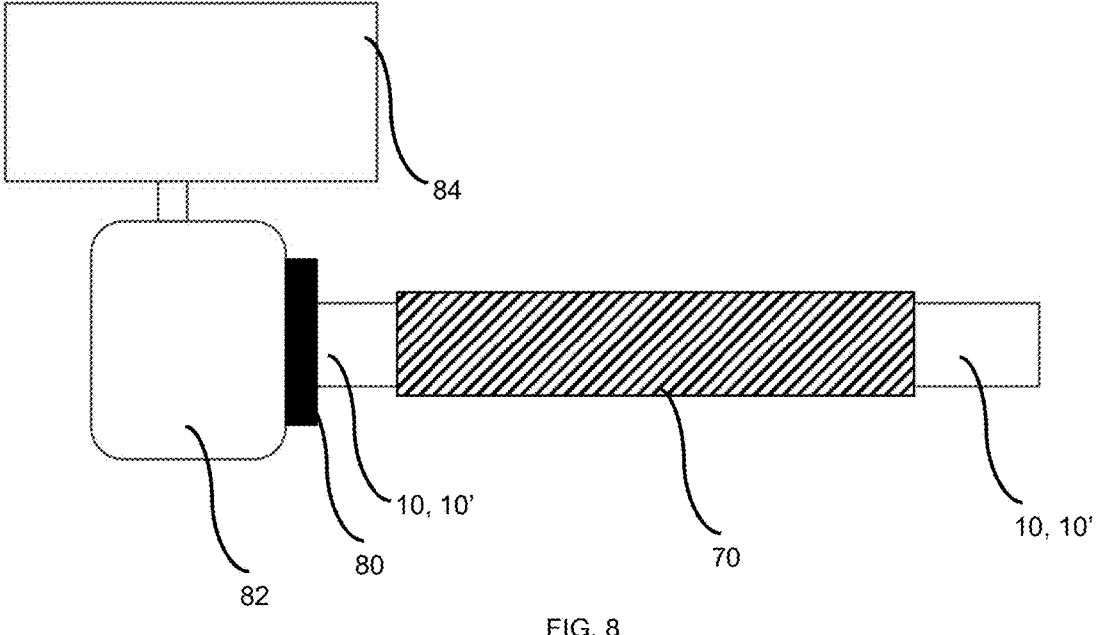

FIG. 8

FIG. 8. A section of a native pipe with a composite sleeve during inflation and curing 82  Fluid delivery device for flowing fluid into the composite sleeve. May include a heater, a pump, a controller for controlling the temperature and/or pressure and/or flow rate of the fluid in the sleeve.

80 Coupling between fluid delivery device and composite sleeve

84 Fluid reservoir

FIG. 9 Section of a native pipe having an internal composite pipe that is cured in place.

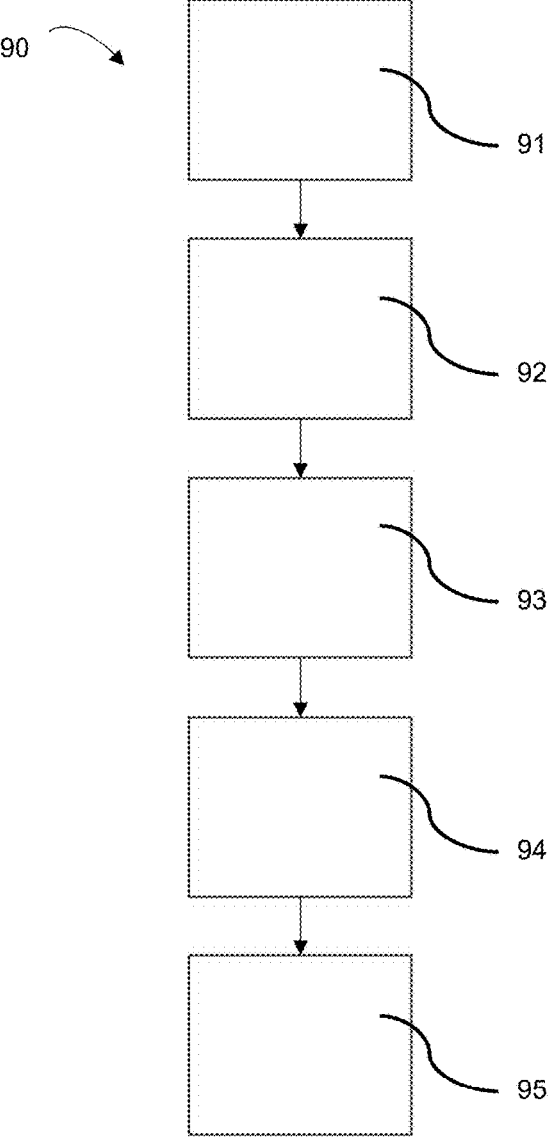

FIG. 10 Exemplary installation steps

90 Method for installing cure in place pipe

91 Inserting a composite sleeve into native pipe, preferably while in a collapsed configuration 92 Attaching one end of pipe to a fluid delivery device for delivering a fluid (preferably heated) into the composite sleeve 93 Filling the composite sleeve with the fluid for applying pressure to the inside surface of the composite sleeve.

94 Activating the cure of the one-part resin composition inside the native pipe

95 Curing the one-part resin composition for forming the composite pipe.

FIG. 11  Roll of sleeve material with multiple windings.

72 Winding of flattened composite sleeve

FIG. 12 Composite sleeve including multiple core layers

25 Additional layer (reinforcing layer between core layers of the one-part resin composition)

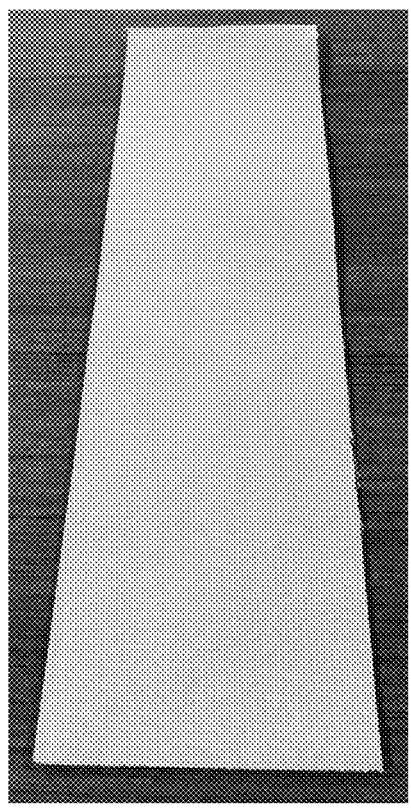
FIG. 13. Composite sheet that may be employed for producing a composite sleeve
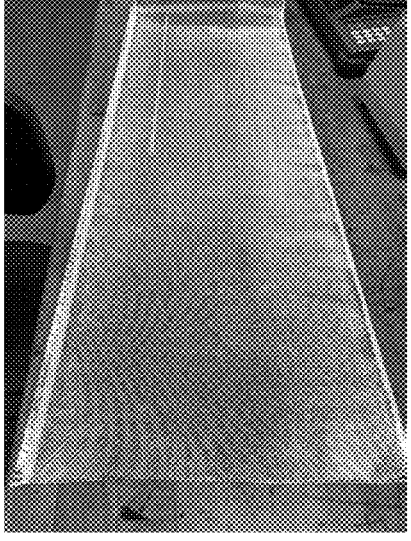
FIG. 14. Composite sheet that may be employed for producing a composite sleeve.

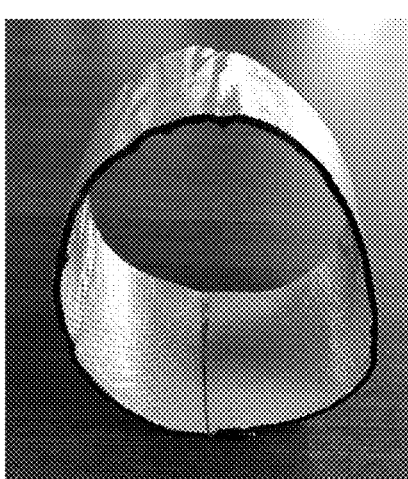
FIG. 15. Collapsible composite sleeve
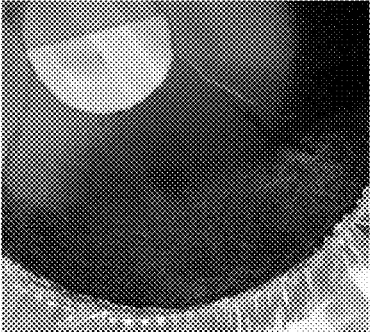
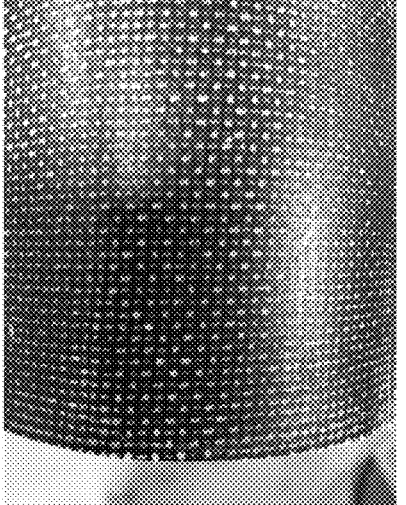
FIG. 16A     FIG. 16. B     FIG. 16.C
FIG. 16A. Cured pipe prepared from a composite sleeve
FIG. 16B. Inner surface of the cured pipe.
FIG. 16C. Outer surface of the cured pipe.

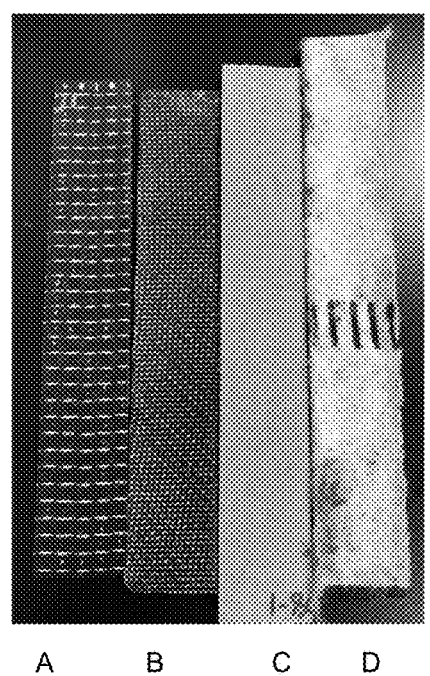
A     B     C     D
FIG. 17. Examples of materials which may be employed for a composite sleeve.
|  | A | B | C | D |
|---|---|---|---|---|
| Bottom Layer | Open weave glass fiber fabric | Tight weave glass fiber fabric | Tight weave glass fiber fabric | Felt |
| Core Layer | L-5001 | L-5001 | XP-9008 | L-5001 |
| Top Layer | Open weave glass fiber fabric | Tight weave glass fiber fabric | Tight weave glass fiber fabric | Felt |

COMPOSITE SLEEVE FOR FORMING A CURE IN PLACE PIPE, COMPOSITE PIPES, AND MATERIALS AND METHODS THEREOF

FIELD

The teachings herein are directed towards composite sleeves for producing a cure-in-place pipe, methods for producing a composite sleeve, pipes produced from a composite sleeve, and methods for producing a pipe using a composite sleeve. The composite sleeve includes at least a layer of a curable one-part resin composition that is in a solid state at about 25° C. Curing of the one-part resin composition preferably is activated by heating to a temperature of about 50° C. or more. The composite sleeve preferably includes one or more layers of a reinforcing fabric which strengthens the composite pipe formed from the composite sleeve.

BACKGROUND

Pipes are often used in walls of structures or underground. When such a pipe fails, the traditional repair required the uncovering the pipe and replacing the pipe with a new pipe. Such repairs can be expensive and time consuming.

More recently, approaches for repairing pipes include inserting or constructing a new pipe inside the failed pipe. In one approach a new pipe is constructed using a sock-like carrier that is impregnated with a two-part epoxy resin. An example of such an approach is described in "What is Cured in Place Pipe" at https://perma-liner.com/what-is-cured-in-place-pipe/ (as accessed on Jul. 7, 2020). This approach requires the handling of liquid epoxy resins in the field which can have environmental issues. The sock is filled with the two-part epoxy resin and then pulled through a roller apparatus. The mixing and curing of the two-part epoxy resin are coupled and are not independently controllable. Once the epoxy resin is mixed, there is a limited time for After mixing the two parts, the two-part epoxy resin can also prematurely cure, particularly if the job takes a long time and/or the outdoor temperature is high. This process also requires special equipment for the inverting of the sock as it is inserted into the failed pipe. The impregnated carrier extends at least the length of pipe being repaired. After the impregnated sock is in the pipe, a bladder is placed inside the sock and the bladder is filled with pressurized water to apply pressure and inflate the pipe. The bladder is needed to prevent the water from forcing the liquid epoxy out of the carrier. For example, without the bladder, the pressurized water can force the liquid epoxy to flow through cracks in the failed pipe.

Because the cured in place pipe is located inside the failed pipe, the inner diameter of the cured in place pipe will be smaller than the inner diameter of the failed pipe. The reduction in the diameter is approximately twice the wall thickness of the new pipe. This reduction in diameter can be sufficient to reduce flow in the pipe, particularly for pipes having a low diameter.

There is a need for new approaches to a cured in place pipe which removes the need for handling liquid epoxy in the field. There is a need for new approaches to a cured in place pipe which removes the need for two-part epoxy compositions which cure over time at room temperature. There is a need for new approaches to a cured in place pipe which reduces the need for in-field equipment and in-field time for one or more of the following: mixing of two part epoxy resin compositions, filling a carrier with the liquid epoxy resin composition, rolling the carrier with the resin, inverting the carrier inside a failed pipe, and inserting a bladder into the inverted carrier. There is a need for new approaches to a cured in place pipe which decouples the preparation of the resin composition from the cure of the resin. There is also a need for approaches that result in a stronger pipe and/or a reduction in wall thickness (and consequently improved inner diameter). There is also a need for approaches that result in faster curing of the resin so that the time for a repair can be reduced.

SUMMARY

One aspect according to the teachings herein is directed to a composite sleeve comprising: a core layer including a curable one-part resin composition interposed between a first layer and a second layer; wherein the sleeve has an inner surface defining an opening and an outer surface; wherein the first layer, the second layer, and the core layer each has a cylindrical shape or are capable of being expanded into a cylindrical shape by applying an excess pressure to the inner surface; wherein the one-part resin composition is a solid having a tensile modulus of about 10 MPa or more, as measured according to ISO 527 at a temperature of 23° C.

This aspect may be characterized by one or any combination of the following features: the one-part resin composition cures at a temperature of about 50° C. or more, preferably about 70° C. or more; the first layer and the second layer each includes or consists of a fabric having reinforcing fibers, preferably glass fibers; the fabric is woven; the one-part resin composition has a sufficiently low viscosity at 80° C. so that it can flow into spaces between glass fibers or glass bundles, prior to curing of the resin composition; the one-part resin composition includes one or more epoxy resins, and the resin composition has a sufficiently low viscosity at 80° C. so that it partially flows through fabric layers, preferably through fiberglass fabric layers; the composite sleeve includes a protective film on the outside surface of the sleeve, a barrier layer film on the inside surface of the sleeve, or both, preferably wherein the protective film is formed a polymeric composition including or consisting of a thermoplastic urethane; the barrier layer film is formed a polymeric composition including or consisting of a thermoplastic urethane; the one-part resin composition includes a foaming agent that is activated at a temperature of about 80° C. or more; the composite sleeve is formed from a multi-layered sheet; the composite sleeve is shelf stable at a temperature of about 40° C. or less for 30 days or more, preferably wherein any increase in the tensile modulus (measured according to ISO-527) of the one-part resin composition after storage for 30 days at 40° C. is about 50% or less; the composite sleeve has a predetermined diameter; the composite sleeve cures in place for repairing an existing pipe; upon curing, the composite sleeve has a sufficiently high peak stress so that the cured sleeve can provide integrity to the pipe in regions where the existing pipe (e.g., a previously installed underground pipe) is damaged, penetrated, cracked, or missing; the composite sleeve cures in less than about 40 minutes when steam having a temperature of about 135° C. is flowed through the opening of the sleeve; the composite sleeve has a collapsed configuration so that two regions of the inner surface are in contact; or the composite sleeve is in the form of a coil including multiple windings of the composite sleeve.

Another aspect according to the teachings herein is directed to a method comprising the steps of: inserting a composite sleeve of any of claims 1 through 16 through an existing pipe, wherein the composite sleeve has an opening extending from a first end to a second end of the composite sleeve; flowing a steam through the opening of the composite sleeve or inserting a steam into one end composite sleeve while the other end of the composite sleeve is sealed; wherein the steam causes a positive pressure against an inner surface of the composite sleeve and causes an increase in temperature of the composite sleeve.

This aspect may be characterized by one or any combination of the following features: the one-part resin composition partially flows through the glass fibers and cures from a temperature and a pressure of the steam; the one-part resin composition includes a foaming agent and the temperature of the fluid (e.g., steam) causes the foaming agent to activate; the composite sleeve has a collapsed configuration and the fluid (e.g., steam) causes the sleeve to expand into a cylindrical configuration to remove contacts between regions of the inner surface; the fluid (e.g., the steam) has a temperature of about 110° C. or more and contacts the inner surface of the sleeve for about 5 minutes or more; or the one-part resin composition wets out the glass fibers.

BRIEF DESCRIPTION OF DRAWINGS

FIG. 8 is a diagram showing a section of native pipe and illustrating features that may be employed during the repair of a native pipe. For example, the composite sleeve may extend from one end of the native pipe to the other end of the native pipe. The composite sleeve may be attached to a fluid delivery device for delivering a fluid to the inside of the sleeve.

FIG. 10 is a diagram showing features that may be employed in repairing a native pipe with a composite sleeve.

FIG. 13 is a photograph of a multi-layered sheet material that may be employed for forming a composite sleeve. The sheet includes a core layer of the one-part resin composition between two layers of woven glass fiber fabric.

FIG. 14 is a photograph of a multi-layered sheet material that may be employed for forming a composite sleeve. The sheet includes a core layer of the one-part resin composition between two layers of woven glass fiber fabric.

FIG. 15 is a photograph of a composite sleeve according to the teachings herein. The sleeve is capable of collapsing for inserting into a native pipe and/or for winding of the sleeve into a coil or roll.

FIG. 16A is a photograph of a cured pipe prepared from a composite sleeve according to the teachings herein. FIG. 16B is a photograph showing the inner surface of the cured pipe. As illustrated in FIG. 16B the glass fiber fabric of the first layer may be surrounded by a matrix of the resin composition after cure of the pipe so that the fabric is no longer visible. FIG. 16C is a photograph showing an outer surface of the cured pipe.

FIG. 17 is a photograph showing specimens of various composite sleeve materials prior to cure.

DETAILED DESCRIPTION

Figure 1:
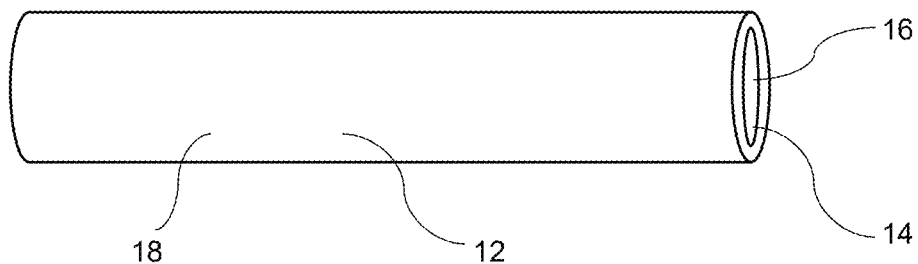
FIG. 1 is a perspective view of a composite sleeve.
Figure 2:
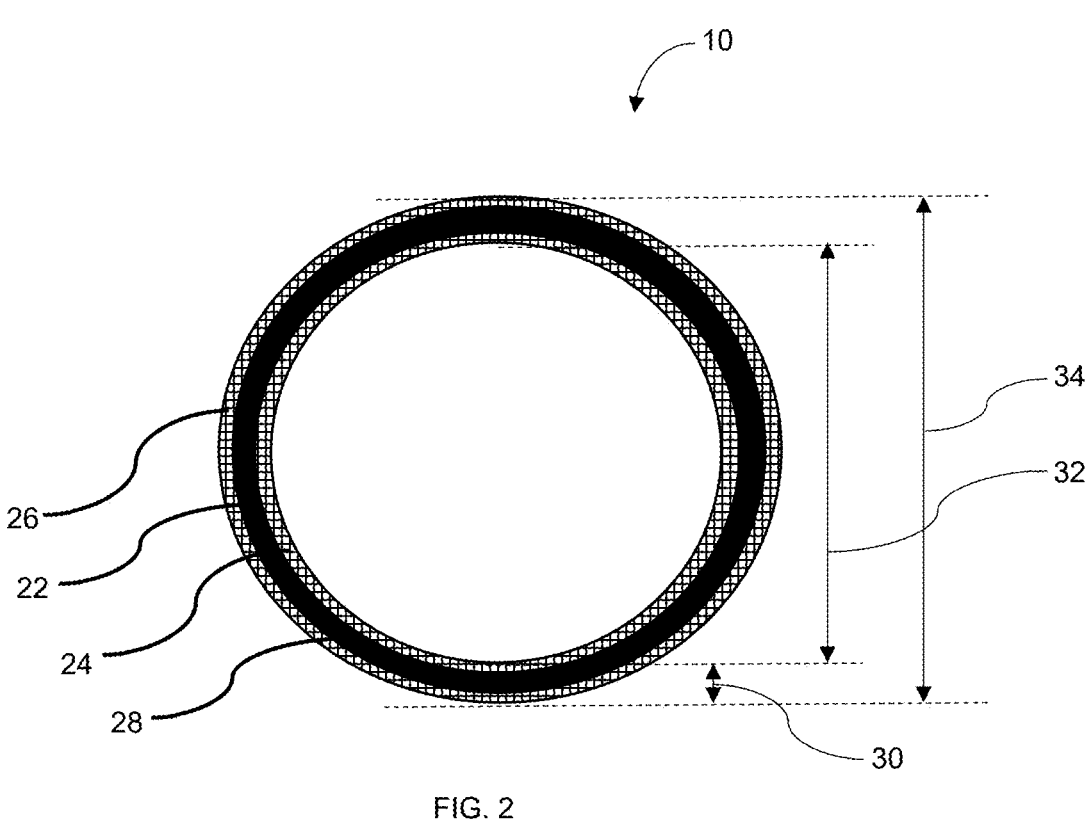
FIG. 2 is a cross-sectional view of a multi-layered composite sleeve.
Figure 3:
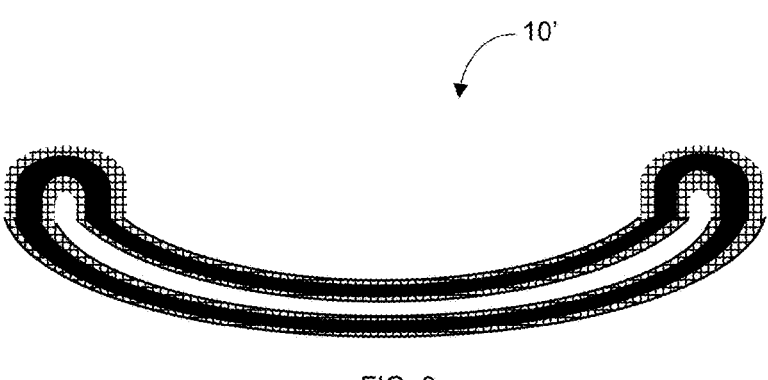
FIG. 3 is a cross-sectional view of a multi-layered composite sleeve having a collapsed configuration.
Figure 4:
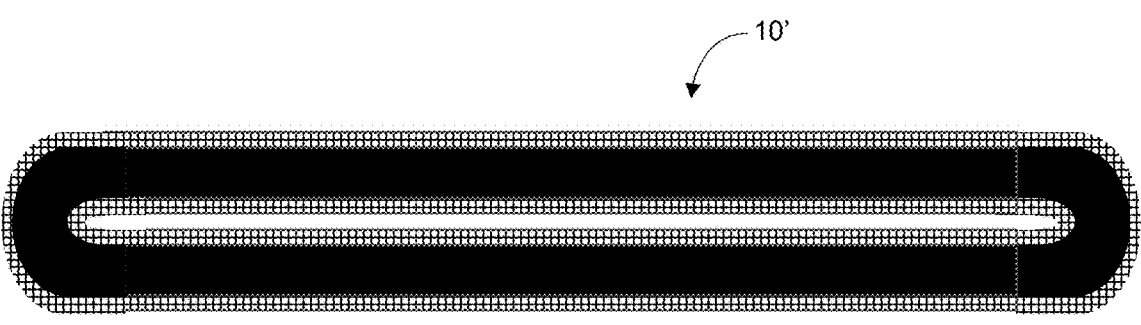
FIG. 4 is a cross-sectional view of a multi-layered composite sleeve having a collapsed configuration.
Figure 5:
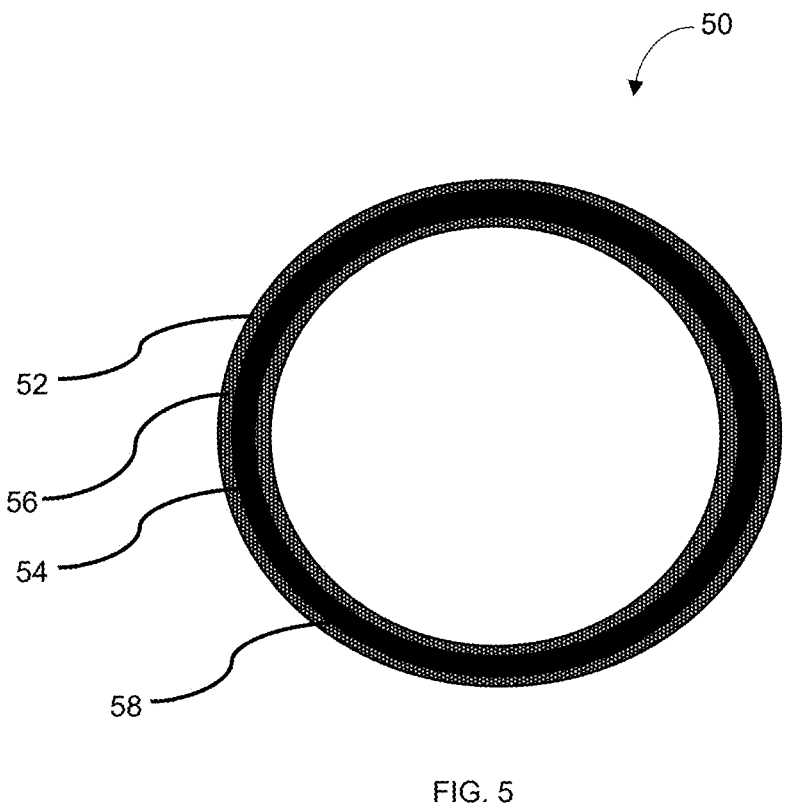
FIG. 5 is a cross-sectional view of a pipe formed from a composite sleeve.
Figure 6:
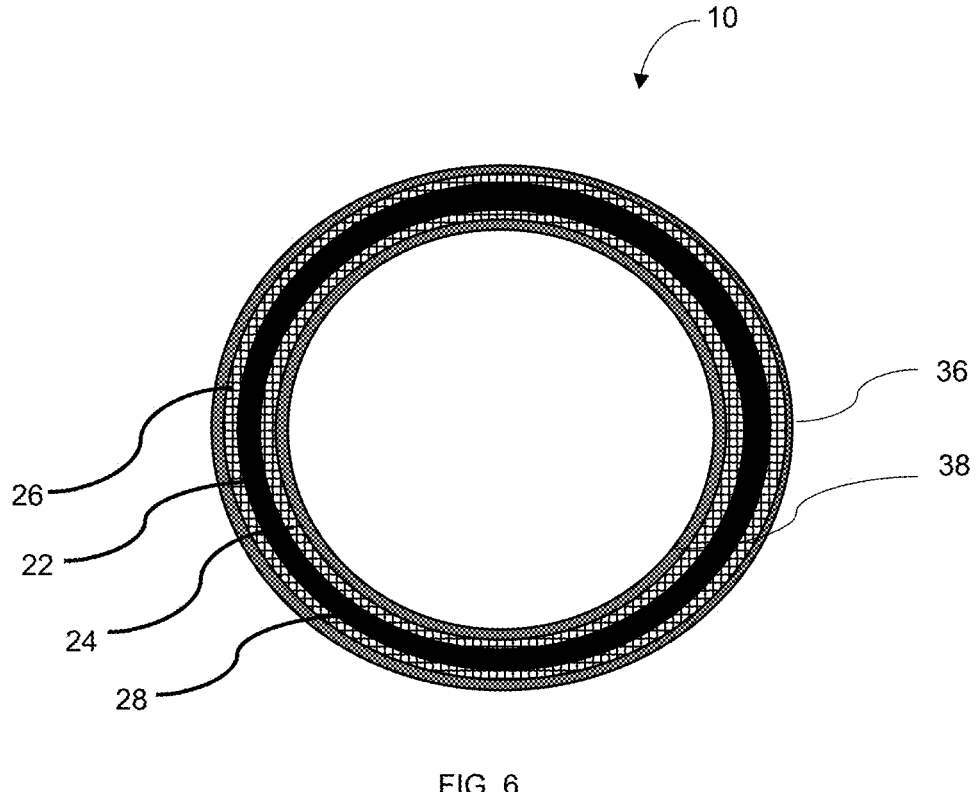
FIG. 6 is a cross-sectional view of a multi-layered composite sleeve. A composite sleeve may include a inner film layer, an outer film layer, or both. The inner film layer may be a barrier film. The outer film layer may be a protective layer and/or an adhesive layer.
Figure 7:
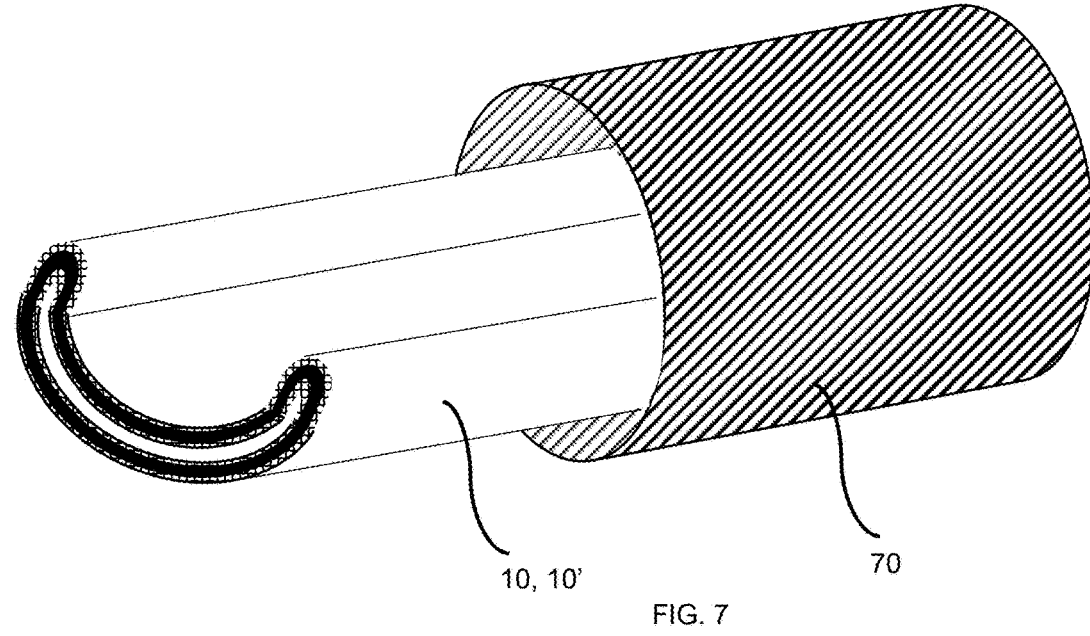
FIG. 7 is a cross-sectional view of a native pipe with a composite sleeve inserted into the native pipe. The composite sleeve may have a portion that extends out of the native pipe.
Figure 9:
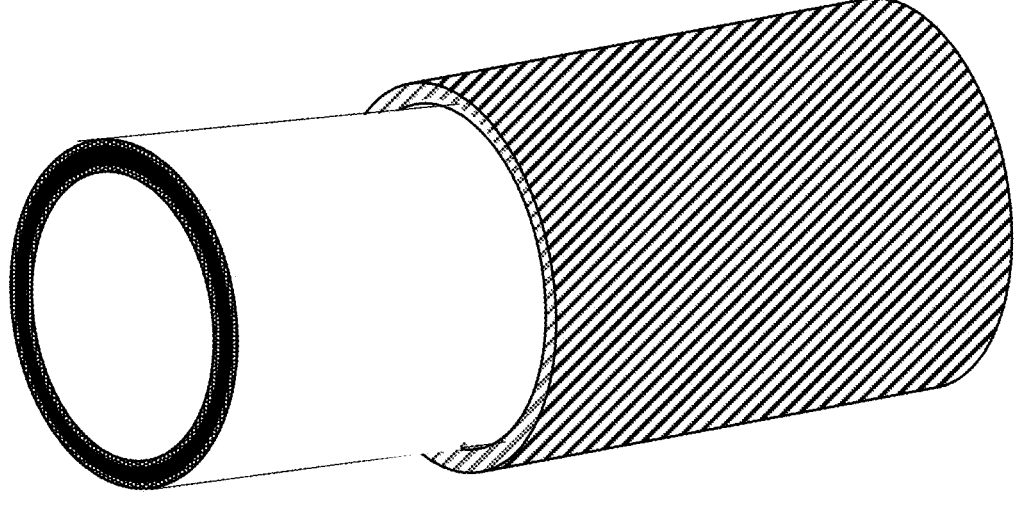
FIG. 9 is a diagram showing a section of a native pipe having a n internal composite pipe that is cured in pipe. As formed, a second of the composite pipe (i.e., the cured pipe) may be extend out of the native pipe. This portion of the composite pipe may be removed or may be allowed to remain.
Figure 11:
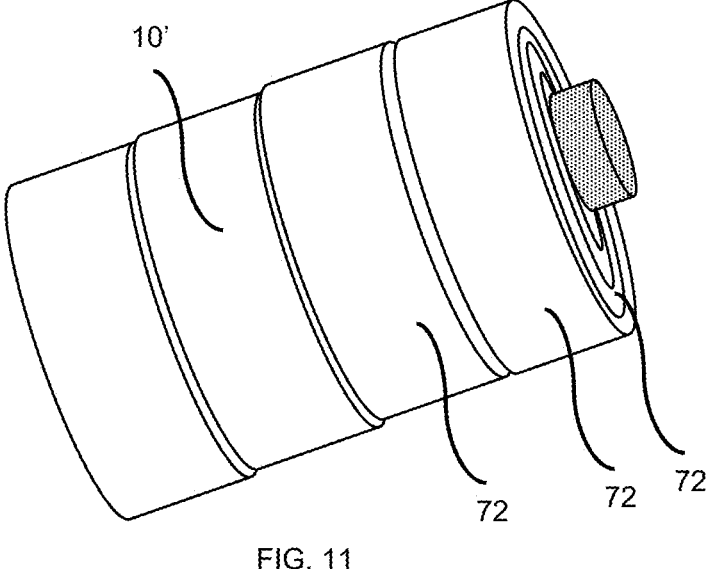
FIG. 11 is a drawing showing a roll or coil of a composite pipe including multiple windings.
Figure 12:
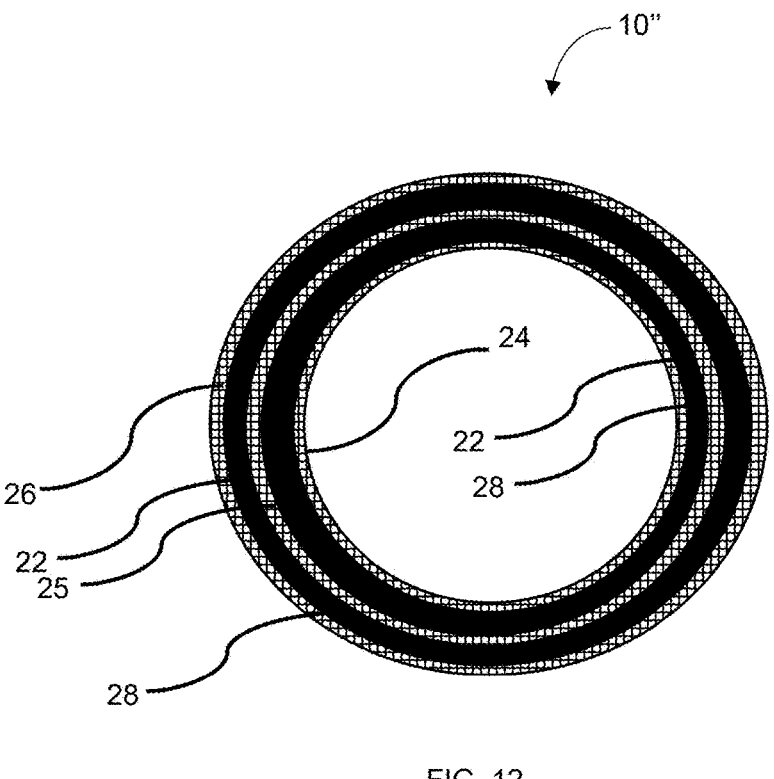
FIG. 12 is a drawing of a composite sleeve including multiple core layers the one-part resin composition. Preferably, two core layers are separated by a layer of a reinforcing fiber material.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. Percentages herein refer to weight percent, unless otherwise indicated.

The teachings herein are directed to a composite sleeve for forming a cure in place pipe, to which is formed from a composite sleeve having a core layer including a curable one part resin composition, to methods for forming the composite sleeve, and to methods for repairing a pipe using the composite sleeve. Before curing, the resin composition is a solid material that is pliable and/or flexible. Curing of the resin composition preferably is activated by heat or radiation. The resin composition preferably has a low modulus so that the composite sleeve can be folded, wound into rolls for storage, or inserted into a damaged pipe needing repair.

The composite sleeve includes the core layer which is interposed between a first layer and a second layer of the composite sleeve. The first layer, the second layer, or both are preferably formed of a fabric. The fabric preferably is a reinforcing fabric which provides increased strength to the pipe after curing.

The core layer, the first layer, and the second layer of the composite sleeve are all solid materials, so that handling of liquid sleeve material is avoided at the location where the cure in place pipe is being formed from the composite sleeve.

The curable one-part resin composition preferably is shelf stable. As used herein, a material is shelf stable if the modulus of the composition (as measured according to ISO 527) does not increase by more than 50%. Preferably, the one-part resin composition is shelf stable at a temperature of about 25° C., preferably about 30° C., more preferably about 35° C., and most preferably about 40° C. The shelf stability may be measured after about 30 days, about 60 days about 120 days, about 240 days, or about 365 days, or more. As the sleeve is shelf stable, it can be prepared away from a field site (i.e., location of a failed pipe needing repair) and stored for extended periods of time until it is needed. As such, the time of preparation of the composite sleeve and the time of installation of the composite sleeve are decoupled.

The curable one-part resin composition is a composition that requires heating to a temperature above typical ambient temperatures to begin curing. For example, the initiation of the curing may be at a temperature of about 50° C. or more, about 70° C. or more, about 90° C. or more, about 100° C. or more, or about 110° C. or more. If the initiation of the curing requires a high temperature, it may be difficult to sufficiently heat the one-part resin composition when it is installed in a failed pipe. Preferably the initiation of the curing is at a temperature of about 220° C. or less, about 200° C. or less, about 180° C. or less, about 170° C. or less, or about 150° C. or less. After installing the composite sleeve into an existing pipe, heat may be provided from a fluid inserted or flowing in the sleeve, for initiating the cure reaction. During curing, heat may flow from the composite sleeve to the existing pipe and/or to the fluid in the sleeve. The heat curable one-part resin composition preferably has an exothermic cure reaction. As such, the heat generated by the cure reaction may be sufficient to maintain or increase the temperature of the one-part resin composition during a time period of curing. Preferably, the curing time is about 4 hours or less, more preferably about 2 hours or less, even more preferably, about 1 hour or less, even more preferably about 45 minutes or less, and most preferably about 30 minutes or less. Typically, the cure time is about 1 minute or more, about 5 minutes or more, about 10 minutes or more, or about 15 minutes or more.

Curing of the one-part resin composition may be activated by heat, by radiation, or a combination thereof. Heat may be applied by any means. Preferably, at least some of the heat is applied via a heated fluid that is inserted or flows through the opening of the composite sleeve. The radiation may be electromagnetic radiation in the form of UV radiation, visible light, infrared radiation, or any combination thereof.

Before curing, the curable one-part resin composition is a solid material that is pliable. The one-part resin composition should be sufficiently pliable so that the configuration of the composite sleeve can be changed from a collapsed state to an expanded state. By way of example, a collapsed state may be a folded state, such as seen in water hoses used by fired departments when rolling the hoses for storage, and an expanded state may be cylindrical state, such as when the outer surfaces of the sleeve is contacting the inner wall of the failed pipe. The one-component resin composition should be a solid material at ambient conditions (e.g., at indoor temperatures of about 23° C., or outdoor temperatures of up to about 30° C. or 35° C.). The one-part resin composition (i.e., in the uncured state) may have a tensile modulus of about 10 MPa or more, preferably about 30 MPa or more, more preferably about 80 MPa or more, and most preferably about 200 MPa or more, as measured according to ISO 527 at 23° C. (and preferably at about 50° C.). The modulus should be sufficiently low so that the sleeve can be expanded and collapsed, such as discussed herein. The uncured one-part resin composition may have a tensile modulus of about 1000 MPa or less, about 600 MPa or less, about 450 MPa or less, or about 300 MPa or less, as measured according to ISO 527 at 23° C.

The first layer and the second layer may be formed of the same material or may be formed of different material.

Barlow's Formula is often used to calculate bursting pressures of pipes. Barlow's formula states:

$$P_y = 2S_y t_w/d_p$$

Where $P_y$ is the internal pressure at minimum yield; $S_y$ is the yield strength; $t_w$ is the wall thickness of the sleeve; and $d_p$ is the diameter of the sleeve. From Barlow's Formula, it is seen that for a given internal pressure requirement and sleeve diameter, it is possible to decrease the wall thickness by increasing the yield strength.

Applicant has determined that this is particularly important in repairing an existing pipe because the composite sleeve will decrease the internal diameter of the pipe by about $2 \times t_w$. If $t_w$ is too large, then the flow rate and fluid carrying capacity of the repaired pipe will be greatly reduced. Preferred composite sleeves according to the teachings herein, after curing, have generally high mechanical properties (e.g., high modulus, high peak stress, high elongation at break) so that a generally low wall thickness can be used. The mechanical properties may be measured from a specimen obtained from the composite sleeve or from a specimen obtained from a cured sheet stock of the composite material used for the composite sleeve. Unless stated otherwise, the mechanical properties are measured by three point bend with a span of about 100 mm and a speed of about 5 mm/min on a specimen having a width of about 25 mm and a length of about 150 mm. Typically, the thickness of the test specimen is about 1 mm to about 10 mm. Preferably, the cured composite material (e.g., the composite sleeve after cure) has a maximum stress (peak stress) of about 31.0 MPa or more, more preferably about 34.5 MPa or more, even more preferably about 37.9 MPa or more, even more preferably about 48.3 MPa or more, even more preferably about 58.6 MPa or more, even more preferably about 68.9 MPa or more, and most preferably about 79.3 MPa or more. The peak stress may be about 300 MPa or less, about 200 MPa or less, or about 100 MPa or less. Preferably, the cured composite material has a modulus of about 1724 MPa or more, more preferably about 2758 MPa or more, even more preferably about 3450 MPa or more, even more preferably about 4800 MPa or more, even more preferably about 5800 MPa or more, even more preferably about 6800 MPa or more, and most preferably about 7250 MPa or more. The modulus may be about 18000 MPa or less, about 12000 MPa or less, or about 10000 MPa or less. Preferably, the cured composite material has an elongation at break of about 2 mm or more, more preferably about 3 mm or more, even more preferably about 5 mm or more, even more preferably about 7 mm or more, and most preferably about 9 mm or more. The extension at break may be about 40 mm or less, about 30 mm or less, or about 25 mm or less.

The wall thickness ($t_w$) of the composite sleeve, before cure, should be sufficiently thin so that the wall does not greatly reduce the ability of the pipe to carry a fluid. Preferably, the ratio of the wall thickness ($t_w$) of the composite sleeve to the outer diameter ($d_o$) of the composite sleeve is about 0.15 or less, about 0.10 or less, about 0.08 or less, about 0.06 or less, about 0.04 or less, or about 0.03 or less. The wall thickness of the composite sleeve, before cure, should be sufficiently thick so that the composite sleeve does not fail during use. If the resulting cured pipe is too thin, the pipe may fail from the pressure inside the pipe, from impact, or other means. Preferably the ratio of the wall thickness of the composite sleeve to the outer diameter of the composite sleeve is about 0.003 or more, about 0.008 or more, about 0.012 or more, or about 0.018 or more.

The core layer preferably is in direct contact with the first and second layers.

The first layer, the second layer, and preferably both the first and second layers include one or more reinforcing fibers. The first layer and the second layer may be formed of the same material or formed of different materials. The reinforcing fiber may be any fiber that increases the strength of the cured pipe formed from the composite sleeve. Reinforcing fibers which may be used include polymer fibers, metal fibers, carbon fibers, glass fibers, ceramic fibers, and combinations thereof. The fibers preferably are in a mesh or fabric. Fabrics including reinforcing fibers may be woven fabric or non-woven fabric. The fabric may have an open structure so that less than about 50% of the one-part resin composition is covered by the fabric. For example, the fabric may be an open weave fabric. The fabric may have a closed or tight structure, where at least about 50% (preferably about 80% or more) of the one-part resin composition is covered by the fabric. For example, the fabric may be a tightly woven fabric. A preferred reinforcing fiber is a fiberglass fabric.

The curable one-component resin composition may be based on one or more polymer, one or more prepolymers, one or more monomers, or a combination thereof. The individual components may be liquid or solid at 25° C. However, the amount of any liquid components should be sufficiently low so that the resin composition is a solid at 25° C., and preferably at 40° C., as discussed herein. Preferably, the amount of any liquid components in the resin composition is about 40 weight percent or less, more preferably about 30 weight percent or less, even more preferably about 25 weight percent or less, and most preferably about 20 weight percent or less, based on the total weight of the resin composition. Components in the resin composition that are liquid at 25° C. may improve the flexibility of composite sleeve, so that it can be easily inserted into a native pipe and/or easily wound into a coil in a flattened state. Preferably the amount of components in the resin composition that are liquid at 25° C. is about 2 weight percent or more, more preferably about 4 weight percent or more, even more preferably about 6 weight percent or more, even more preferably about 8 weight percent or more, and most preferably about 10 weight percent or more, based on the total weight of the resin composition. Components in the resin composition that are liquid at a temperature of about 70° C. or more may improve the wetting of the reinforcing fibers during curing of the resin composition. Preferably the amount of components in the resin composition that are liquid at 70° C. is about 20 weight percent or more, more preferably about 30 weight percent or more, even more preferably about 40 weight percent or more, even more preferably about 50 weight percent or more, and most preferably about 60 weight percent or more, based on the total weight of the resin composition.

The one-part resin composition includes at least one component that is heat curable or light curable. For example, the one-part resin composition may include one or more epoxy resins that can be cured to form a thermoset material. Preferably the one-part resin composition includes one or more solid epoxy resins (solid about 25° C.), more preferably, the one-part resin composition includes one or more solid epoxy resins and one or more liquid epoxy resins (liquid at about 25° C.).

Examples of curable one-part resin composition which may be employed include L-5001, L-5570, L-9001, and XP-9008, each available from L&L PRODUCTS (Romeo, Mich., USA).

The one-part resin composition may be a material that is dry to the touch or a material that is tacky.

If the one-part resin composition is tacky, the first and second layers may provide surfaces that are non-tacky. A portion of the one-part resin composition may penetrate into the first and second layers.

The one part resin composition may include one or more curable base resins, one or more curatives, one or more cure accelerators, one or more fillers, one or more adducts, one or more flexibilizers, one or more process aids, one or more blowing agents, one or more blowing agent accelerators, one or more thermoplastics, one or more additives, one or more colorants, one or more polymer particles, one or more core/shell polymers or any combination thereof.

Examples of curable base resins which may be employed include materials including one or more epoxide groups. Other base resins which may be employed include polyvinyl butyral. The base resin may include a base resin described in paragraphs 0035 to 0036 of International Patent Application PCT/US2019/045285 (published as WO 2020/033393 A1), incorporated herein by reference.

Examples of adducts which may be used include epoxy elastomer adducts. The epoxy elastomer adduct may be an adduct described in paragraphs 0020 to 0022 of International Patent Application PCT/US2019/045285 (published as WO 2020/033393 A1), and in United States Patent Publication 2004/020455, both incorporated herein by reference.

Examples of core/shell polymers which may be employed includes materials described in paragraphs 0024 to 0029 of International Patent Application PCT/US2019/045285 (published as WO 2020/033393 A1), and in U.S. Pat. Nos. 3,984,497; 4,096,202; 4,034,013; 3,944,631; 4,306,040; 4,495,324; 4,304,709; and 4,536,436, each incorporated herein by reference.

The one-part resin composition may include a polymer or additive for increasing strength, strain to failure, and/or expansion properties of the cured resin composition, such as described in paragraphs 0030 to 0031 of International Patent Application PCT/US2019/045285 (published as WO 2020/033393 A1), incorporated herein by reference.

The one part resin composition may include one or more flexibilizers. The flexibilizer may include one or more phenol containing compound and or one or more elastomer. Preferred flexibilizers include polymers that are amine modified, or polymers that are epoxy modified. The flexibilizer may include one or more flexibilizers are described in paragraph 0032 to 0034 of International Patent Application PCT/US2019/045285 (published as WO 2020/033393 A1), incorporated herein by reference.

The one-part resin composition may include one or more curing agents and/or curing agent accelerators. The curing agent and curing agent accelerators which may be employed includes compounds described in paragraphs 0049 to 0050 of International Patent Application PCT/US2019/045285 (published as WO 2020/033393 A1), incorporated herein by reference.

The one-part resin composition may include one or more reinforcement components and/or fillers. The reinforcement component or filler may include materials described in paragraphs 0051 to 0053 of International Patent Application PCT/US2019/045285 (published as WO 2020/033393 A1), incorporated herein by reference.

Blowing Agent

The one-part resin composition may be substantially or entirely free of blowing agent so that upon curing, the cured resin is substantially free of pores. For example, the volume of pores may be about 10 volume % or less, about 5 volume % or less, about 2 volume % or less, about 1 volume % or less, or about 0 volume % of the volume of the cured resin.

The one-part resin composition may include a blowing agent that is activated after the sleeve is installed. If employed, the blowing agent is selected so that it is activated during the heating of the sleeve for curing the one-part resin composition. The blowing agent may be activated before the curing begins or during the curing reaction. The blowing agent may help force the one-part resin composition into the first and second layers. For example, the blowing agent may help the resin composition wet the fibers of a reinforcing fabric. Typically, the blowing agent is employed in sufficient quantity so that the volume expansion of the one-part resin composition is about 10% or more, about 20% or more, about 30% or more, about 40% or more, or about 50% or more. If too much blowing agent is used, the strength of the pipe may be reduced too much. Preferably the volume expansion of the one-part resin composition is about 250% or less, more preferably about 180% or less, even more preferably about 120% or less, even more preferably about 100% or less, and most preferably about 90% or less. Preferably pores created from the blowing agent are closed cells. It will be appreciated that the pressure of a fluid in the sleeve during the cure may reduce the level of volume expansion in the one-part resin composition from the blowing agent. The volume expansion may be measured from the initial volume of the resin composition and the volume of the resin composition after curing and activation of the blowing agent: $V.E.=100\% \times (V_{expanded}-V_{initial}) V_{initial}$.

The composite sleeve may include a barrier layer film on the inner surface of the sleeve. The barrier layer film may minimize or prevent contact between the cured resin composition and a fluid that flows through the pipe during use of the pipe. By way of example, the barrier layer may be formed of a material that is suitable for contact with water, particularly for contact with potable water. The barrier layer film may reduce failure of the cured resin due to exposure to a fluid that flows through the pipe. By way of example, the barrier layer may reduce or prevent environmental stress cracking of the cured resin, swelling of the resin, or reaction of the resin by a fluid flowing through the cured pipe. The barrier layer film preferably covers the entire inner surface of the sleeve. The barrier layer film preferably has a thickness of about 300 μm or less, about 200 μm or less, about 100 μm or less, or about 50 μm or less. The barrier layer film preferably has a thickness of about 5 μm or more, or about 10 μm or more. The barrier layer film preferably is in direct contact with the first layer. The barrier layer film preferably is formed of a polymeric composition including one or more polymers. A particularly preferred polymer for the barrier layer film is a thermoplastic polyurethane.

The composite sleeve may include a protective film on the outer surface of the sleeve. The protective film may protect the second layer from becoming damaged while the sleeve is inserted into the native pipe being repaired. The protective film may also improve adhesion of the sleeve to the native pipe. Preferred protective films have a thickness of about 200 μm or less, about 100 μm or less, about 50 μm or less, about 25 μm or less, or about 15 μm or less. Preferably the protective film is in direct contact with the second layer. The protective film preferably is formed of a polymeric composition including one or more polymers. A particularly preferred polymer is a thermoplastic polyurethane.

The activation of the blowing agent and the cure activation of the one-part resin composition may occur at the same temperature or at different temperatures. Preferably, the activation temperature of the blowing agent (Tb) and the cure activation temperature (Tc) are similar temperatures. For example, the absolute difference between Tb and Tc may be about 40° C. or less, about 30° C. or less, about 20° C. or less, about 10° C. or less, about 5° C. or less, or about 0° C. If the activation temperature of the blowing agent is too low, the gas may escape, or large pores may form before the material cures. If the activation temperature of the blowing agent is too high, the material may cure too much before the blowing agent is activated resulting and the effect of the blowing agent on flowing the resin composition through the fabric layer may be reduced or prevented. The composition may also include one or more blowing agent accelerators. Preferred blowing agents and blowing agent accelerators include compounds described in paragraphs 0037 to 0041 of International Patent Application PCT/US2019/045285 (published as WO 2020/033393 A1), incorporated herein by reference.

The activatable material may include one or more thermoplastic polymers. The thermoplastic polymer may be a homopolymer or copolymer. The thermoplastic polymer may be a copolymer including one or more olefins. The thermoplastic polymer may be generally free or entirely free of olefins. The polymer may include a polymer described in paragraph 042 to 0049 of International Patent Application PCT/US2019/045285 (published as WO 2020/033393 A1), and in U.S. Pat. Nos. 5,275,853; 5,464,924 and 5,962,093, each incorporated herein by reference.

It is contemplated that most nearly any additional chemicals, materials or otherwise may be added to the one-part resin composition assuming they are suitable for the composition and suitable for a chosen application of the composition.

Other additives, agents or performance modifiers may also be included in the resin composition as desired, including but not limited to a UV resistant agent, a flame retardant, a polymeric particle, a heat stabilizer, a colorant, a processing aid, a lubricant or the like.

It will be appreciated that the composite sleeve may have more than one core layers of the one-part resin composition. Preferably, the composite sleeve includes reinforcing fibers between adjacent core layers. This may be particularly important for composite sleeves requiring high strength that will be used for constructing large diameter pipes of about 150 mm or more, 300 mm or more, or 600 mm or more).

Method

The core layer may be formed from the one-part resin composition. The core layer may be formed by extrusion, molding, thermoforming, calendaring, or any combination thereof. The core layer may be formed in a cylindrical shape or may be formed as a flat sheet which is later formed into a cylindrical shape. For example, a composite sheet including the core layer between two layers of reinforcing fibers may be formed by interposing a sheet of the one-part resin composition between the two layers. The composite sheet may then be formed into a cylindrical shape. As another example, the one-part resin composition may be formed, preferably by profile extrusion, into a cylindrical shape. The one-part resin composition may be extruded over a layer of including the reinforcing fiber. A layer of reinforcing fiber may be positioned over the core layer, preferably in an in-line operation. Forming of the core layer preferably is at a temperature at which the resin composition flows and below a temperature at which the cure and/or the blowing agent is activated.

After forming the composite sleeve, the sleeve may be compressed into a generally flat configuration for winding.

Preferably, the core composite sleeve is formed in a continuous process so that long sleeves can be prepared.

The composite sleeve preferably is prepared using equipment in a location remote from the location where the composite sleeve will be installed. For example, the composite sleeve may be prepared in an indoor factory equipped for handling the materials of the composite sleeve, and especially for handling the one-part resin composition.

The composite sleeve, once prepared, may be stored for an extended period of time, until it is needed for repairing a native pipe. The storage time may be about 8 hours or more, about 1 day or more, about 30 days or more, about 60 days or more, about 180 days or more, or about 360 days or more. The storage temperature may be about 10° C. or more, about 20° C. or more or about 25° C. or more. The storage temperature may be about 40° C. or less, or about 35° C. or less.

The composite sleeve may be placed inside a native pipe. When inserting the composite sleeve into the native pipe, the sleeve preferably is in a compressed configuration. For example, inner surfaces of the composite sleeve may be in contact so that it insertion is easier.

The composite sleeve may be used for repairing a native pipe that is damaged or has failed. The native pipe may be made of any type of material. For example, the native pipe may be a polymer pipe, a metal pipe, a composite pipe, a ceramic pipe, a concrete pipe, or any combination thereof. The native pipe may have a crack, a puncture, a leak, a reduced wall thickness, or other defect. The composite sleeve may be used to form a new pipe, referred to as a cured pipe (or cured in place pipe) inside the native pipe.

This may be achieved using the composite sleeve without needing to add any additional compounds at the work site (e.g., at the location and surroundings of the native pipe). As the layers of the composite sleeve are solid materials, the handling of curable liquid materials is avoided.

At least a portion of the native pipe may be in a location that makes it difficult to remove and replace the native pipe. For example, some or all of the native pipe may be underground, under a building, under a road, under a different structure, in a wall, in a roof, in a floor, or in a different structure, or any combination thereof.

The method may include attaching one end of the composite sleeve to a fluid delivery device for delivering a fluid (preferably heated) into the opening of the composite sleeve. The other end of the composite sleeve may be kept at least partially open (so that fluid can flow through the pipe) or may be closed so that the fluid cannot flow through the other end.

The fluid delivery device may inflate the composite sleeve with a fluid having an elevated pressure. The fluid may force the composite sleeve from a compressed configuration to an open/cylindrical configuration, preferably along the length of the native pipe and/or the length of the sleeve. The fluid may apply a sufficient force so that an outer surface of the sleeve contacts the inner surface of the native pipe (preferably along an entire circumference of the sleeve).

The method may include a step of curing the one-component resin composition by applying heat or radiation. The heat or radiation preferably is applied from the inside of the sleeve. For example, heat may be applied by using a heated fluid.

The fluid delivery device may control a temperature of the fluid, a flow rate of the fluid through the pipe, or a pressure of the fluid. The fluid may be a liquid or a gas, or a combination thereof. A preferred fluid includes liquid water and/or gaseous water (i.e., steam).

The heating of the resin composition should be sufficient so that the cure is activated and/or the blowing agent is activated. The temperature in the sleeve may be controlled during the cure reaction by controlling the temperature of the fluid flowing into the first end of the sleeve and/or by monitoring the temperature of the fluid flowing out of the second end of the sleeve.

During the heating and/or curing of the resin composition, the resin composition preferably wets the fibers of the first and/or second layer. Some of the resin composition may flow through the first and/or second layers. For example, a sufficient amount of the resin composition may flow through the first and/or second layers so that the fibers are completely surrounded by a matrix of the resin composition. The wetting of the fibers with the resin composition may be assisted or achieved by the activation of the blowing agent and/or by the pressure of the fluid in the opening of the sleeve.

The cure time preferably is about 4 hours or less, more preferably about 2 hours or less, even more preferably about 1 hour or less, even more preferably about 45 minutes or less, and most preferably about 35 minutes or less. The cure time may be about 1 minute or more, about 2 minutes or more, about 4 minutes or more or about 8 minutes or more.

After curing is initiated, or after curing is completed, the fluid may be removed from the composite sleeve (e.g., from the cured pipe formed from the composite sleeve).

The process may include a step of cleaning an inside of the native pipe, prior to inserting the sleeve. For example, the native pipe may be cleaned to remove debris or to remove sharp objects which may damage the cured pipe.

In order to activate the cure, the fluid and/or the resin composition may be heated to a temperature of about 70° C. or more, about 80° C. or more, about 90° C. or more, about 100° C. or more, about 110° C. or more, about 120° C. or more, about 130° C. or more, or about 140° C. or more. The fluid and/or the resin composition may be heated to a temperature of about 250° C. or less, about 220° C. or less, about 190° C. or less, or about 160° C. or less.

The cured pipe is preferably formed from only the composite sleeve, without the need for any additional materials.

EXAMPLES

L-5001 is a heat curable one-part resin composition including a mixture of solid epoxy resin and liquid epoxy resins. L-5001 is a solid at 40° C. and has a shelf life of at least 365 days at 40° C. L-5001 includes a blowing agent and expands about 50-100% when cured without constraint.

XP-9008-1 is a heat curable one-part resin composition including a mixture of solid epoxy resin and liquid epoxy resins. XP-9008-1 is a solid at 40° C. and has a shelf life of at least 365 days at 40° C. XP-9008-1 includes a blowing agent and expands more than about 300% when cured without constraint.

Fabric A—7500 is a woven glass fiber fabric commercially available from BGF INDUSTRIES (Greensboro, N.C., USA), having a weight of 9.64 OSY. The warp yarn and fill yarn are ECG 37 1/2, the warp is 350 lbs/inch and the fill is 250 lb/inch, and the thickness is 0.0133 inch.

Fabric B—3733 is a woven glass fiber fabric commercially available from BGF INDUSTRIES (Greensboro, N.C., USA), having a weight of 5.75 OSY. The warp yarn and fill yarn are ECG 37 1/2, the warp is 250 lbs/inch and the fill is 200 lb/inch, and the thickness is 0.0082 inch.

Fabric C—Open weave glass fiber fabric

Barrier Layer—Thermoplastic polyurethane film

Protective Layer—Thermoplastic polyurethane film

Examples 1 through 6 are prepared using the material shown in Table 1. The core layer is a solid material and is positioned between two fabric layers (first layer and second layer). Thermoplastic polyurethane (TPU) film is placed over each of the fabric layers. The specimens are cured at 132° C. for 20 minutes in a mold. In examples, 1, 3, 4, 5, and 6, the mold thickness constrained the expansion of the resin composition during cure to simulate the pressure of the fluid inside the sleeve during cure. After cure, the specimens are evaluated for wetting out of the fibers with the resin composition. Mechanical properties are tested using 3-point bend at 5 mm/min with a span of about 100 mm, specimen size of about 25 mm×150 mm.

percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the com-

TABLE 1

| | Example 1 | Example 2 | Example 3 | Example 4 | Example 5 | Example 6 |
|---|---|---|---|---|---|---|
| First Layer | Fabric A | Fabric A | Fabric B | Fabric B | Fabric A | Fabric C |
| Core layer | L-5001 | L-5001 | L-5001 | L-5001 | XP-9008-1 | L-5001 |
| Second layer | Fabric A | Fabric A | Fabric B | Fabric B | Fabric A | Fabric C |
| Cure Temperature, ° C. | 132 | 132 | 132 | 132 | 132 | 132 |
| Cure time, min | 20 | 20 | 20 | 20 | 20 | 20 |
| Thickness, mm (after cure) | 3.15 | 4.18 | 1.98 | 3.07 | 6.23 | 3.08 |
| Expansion constrained? | Yes | No | Yes | Yes | Yes | Yes |
| Wetting out of fibers by the resin composition | Good | Incomplete | Very good | Very good | Excellent | Good |
| Mechanical properties (3 point bend) | | | | | | |
| Peak Load, N | 127.5 | 127.3 | 46.3 | 133 | 411.7 | 61.4 |
| Maximum Stress, MPa | 80.2 | 42.8 | 84 | 86 | 63.5 | 40.5 |
| Modulus, MPa | 7724.4 | 4116 | 8302 | 7621.3 | 3961.4 | 3553.8 |
| Extension at break, mm | 15.97 | 8.05 | 18 | 7 | 10.17 | 10.52 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of bination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A composite sleeve comprising:

a core layer consisting of a curable one-part resin composition interposed between a first layer and a second layer;

wherein the sleeve has an inner surface defining an opening and an outer surface;

wherein the first layer, the second layer, and the core layer each has a cylindrical shape or are capable of being expanded into a cylindrical shape by applying an excess pressure to the inner surface;

wherein the one-part resin composition is a solid having a tensile modulus of about 10 MPa or more, as measured according to ISO 527 at a temperature of 23° C.;

wherein the curable one-part resin composition includes one or more epoxy resins.

2. The composite sleeve of claim 1, wherein the one-part resin composition requires heating to a temperature of about 50° C. or more to initiate curing.

3. The composite sleeve of claim 2, wherein the first layer and the second layer each includes or consists of a fabric having reinforcing fibers, preferably glass fibers.

4. The composite sleeve of claim 3, wherein the fabric is woven.

5. The composite sleeve of claim 1, wherein the one-part resin composition has a sufficiently low viscosity at 80° C. so that it can flow into spaces between glass fibers or glass bundles, prior to curing of the resin composition.

6. The composite sleeve of claim 1, wherein the one-part resin composition includes one or more epoxy resins, and the resin composition has a sufficiently low viscosity at 80° C. so that it partially flows through fabric layers, preferably through fiberglass fabric layers.

7. The composite sleeve of claim 1, wherein the composite sleeve includes a protective film on the outside surface of the sleeve, a barrier layer film on the inside surface of the sleeve, or both, preferably wherein the protective film is formed a polymeric composition including or consisting of a thermoplastic urethane, preferably wherein the barrier layer film is formed a polymeric composition including or consisting of a thermoplastic urethane.

8. The composite sleeve of claim 1, wherein the one-part resin composition includes a blowing for activating after the composite sleeve is installed so that a volume of the one-part resin composition is expanded by about 10% or more.

9. The composite sleeve of claim 1, wherein the composite sleeve is formed from a multi-layered sheet.

10. The composite sleeve of claim 1, wherein the composite sleeve is shelf stable at a temperature of about 40° C. or less for 30 days or more, preferably wherein any increase in the tensile modulus (measured according to ISO-527) of the one-part resin composition after storage for 30 days at 40° C. is about 50% or less.

11. The composite sleeve of claim 1, wherein the composite sleeve has a predetermined diameter.

12. The composite sleeve of claim 1, wherein the composite sleeve cures in place for repairing an existing pipe.

13. The composite sleeve of claim 1, wherein, upon curing, the composite sleeve has a sufficiently high peak stress so that the cured sleeve can provide integrity to the pipe in regions where the existing pipe (e.g., a previously installed underground pipe) is damaged, penetrated, cracked, or missing.

14. The composite sleeve of claim 1, wherein the composite sleeve cures in less than about 40 minutes when steam having a temperature of about 135° C. is flowed through the opening of the sleeve.

15. The composite sleeve of claim 1, wherein the composite sleeve has a collapsed configuration so that two regions of the inner surface are in contact.

16. The composite sleeve of claim 1, wherein the space between the first and second layers is substantially filled with the one-part resin composition.

17. The composite sleeve of claim 1, wherein the one-part resin composition is shelf stable at a temperature of about 25° C. for at least 60 days, or shelf stable at a temperature of about 40° C. for at least 30 days.

18. A coil comprising multiple windings of the composite sleeve of claim 1.

* * * * *